United States Patent
Raghoebardajal et al.

(10) Patent No.: US 9,423,880 B2
(45) Date of Patent: Aug. 23, 2016

(54) HEAD-MOUNTABLE APPARATUS AND SYSTEMS

(71) Applicant: Sony Computer Entertainment Europe Limited, London (GB)

(72) Inventors: Sharwin Winesh Raghoebardajal, London (GB); Ian Henry Bickerstaff, London (GB); Simon Mark Benson, London (GB)

(73) Assignee: Sony Computer Entertainment Europe Limited (GB)

(*) Notice: Subject to any disclaimer, the term of this patent is extended or adjusted under 35 U.S.C. 154(b) by 105 days.

(21) Appl. No.: 14/464,052

(22) Filed: Aug. 20, 2014

(65) Prior Publication Data
US 2015/0054734 A1    Feb. 26, 2015

(30) Foreign Application Priority Data
Aug. 21, 2013    (GB) .................................. 1314984.4

(51) Int. Cl.
 G06F 3/01    (2006.01)
 G06K 9/00    (2006.01)
 G02B 27/01   (2006.01)
 G06F 3/03    (2006.01)
 G06K 9/20    (2006.01)

(52) U.S. Cl.
 CPC ............. *G06F 3/017* (2013.01); *G02B 27/017* (2013.01); *G06F 3/0308* (2013.01); *G06K 9/00355* (2013.01); *G06K 9/00375* (2013.01); *G06K 9/2018* (2013.01); *G02B 2027/014* (2013.01); *G02B 2027/0138* (2013.01); *G02B 2027/0187* (2013.01)

(58) Field of Classification Search
 CPC ........................................................ G06F 3/017
 USPC ........................................... 345/156; 348/164
 See application file for complete search history.

(56) References Cited

U.S. PATENT DOCUMENTS

| | | |
|---|---|---|
| 8,179,604 B1 | 5/2012 | Prada Gomez et al. |
| 8,400,555 B1 | 3/2013 | Georgiev et al. |
| 8,581,929 B1 | 11/2013 | Maguire, Jr. |
| 2008/0246777 A1 | 10/2008 | Swanson et al. |
| 2010/0157433 A1 | 6/2010 | Mukawa et al. |
| 2010/0182340 A1* | 7/2010 | Bachelder et al. ............ 345/633 |
| 2013/0182077 A1* | 7/2013 | Holz ............................... 348/46 |
| 2013/0271562 A1 | 10/2013 | Kim et al. |

FOREIGN PATENT DOCUMENTS

| | | |
|---|---|---|
| EP | 1731943 A1 | 12/2006 |
| WO | 2008018943 A1 | 2/2008 |
| WO | 2012149971 A1 | 11/2012 |

OTHER PUBLICATIONS

Combined Search and Examination Report for Application No. GB 1314984.4 dated Feb. 13, 2014.
Search Report for Application No. GB 1314984.4 dated Mar. 31, 2014.
Wikipedia, "Light-field camera", downloaded Aug. 19, 2014, <http://en.wikipedia.org/wiki/Light-field_camera>.

* cited by examiner

*Primary Examiner* — Amare Mengistu
*Assistant Examiner* — Joseph G Rodriguez
(74) *Attorney, Agent, or Firm* — Lerner, David, Littenberg, Krumholz & Mentlik, LLP

(57) ABSTRACT

A head mountable display (HMD) comprises an infrared light source operable to illuminate foreground objects but not background objects greater than a threshold distance from the HMD; one or more cameras operable to capture infrared illuminated images and visible light illuminated images; and an image processor operable to detect, from the infrared illuminated images, foreground objects in the visible light illuminated images.

13 Claims, 13 Drawing Sheets

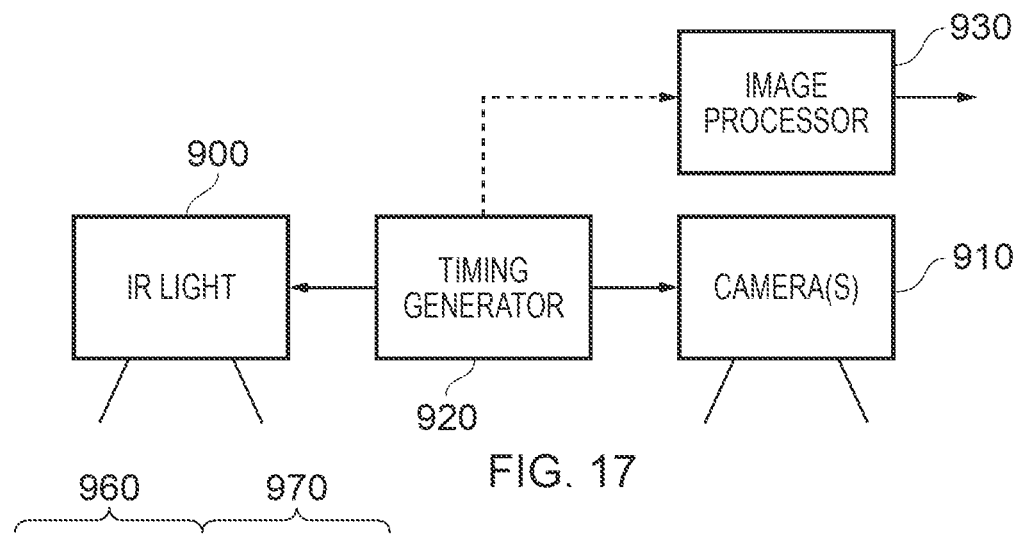
FIG. 17
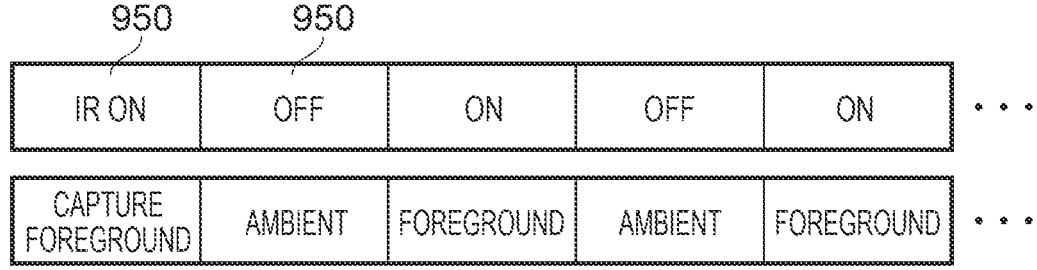
FIG. 18
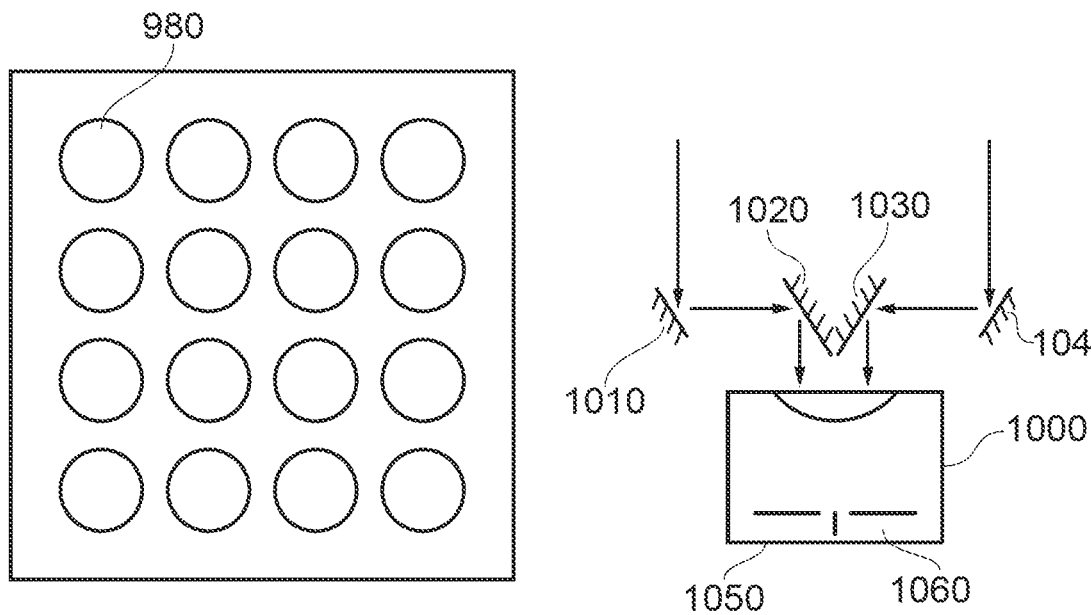
FIG. 19
FIG. 20

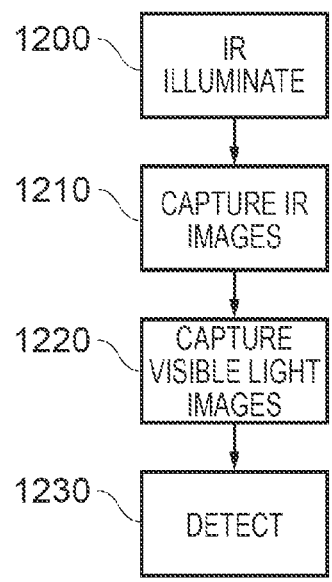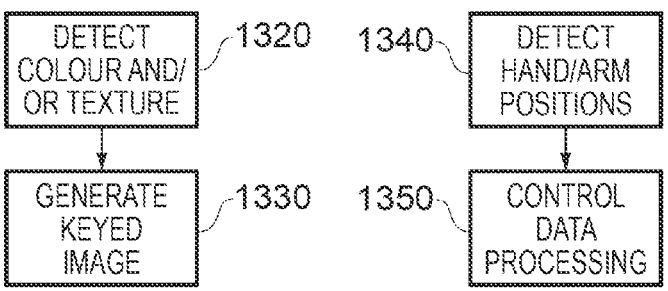
FIG. 21    FIG. 23    FIG. 24
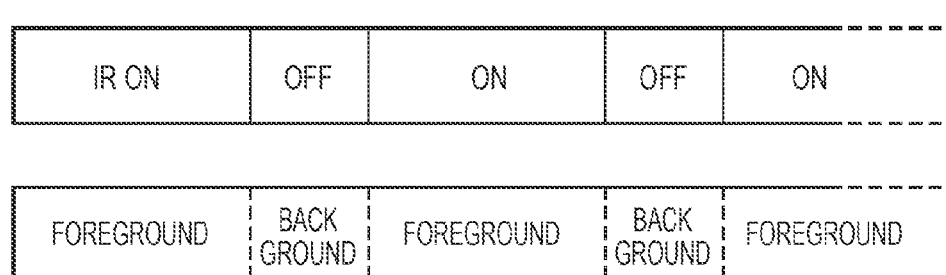
FIG. 25
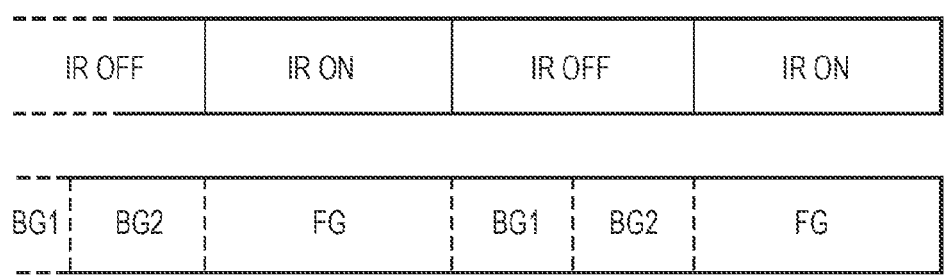
FIG. 26

HEAD-MOUNTABLE APPARATUS AND SYSTEMS

CROSS REFERENCE TO RELATED APPLICATION

The present application claims the benefit of and priority to UK Patent Application No. GB1314984.4, filed Aug. 21, 2013, the entire content of which is incorporated herein by reference.

BACKGROUND

1. Field of the Disclosure

This invention relates to head-mountable apparatus and systems.

2. Description of the Prior Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

A head-mountable display (HMD) is one example of a head-mountable apparatus. Audio headphones comprising a frame supporting one or more audio transducers are another example of a head-mountable apparatus. A head-mounted torch or light is a further example of a head-mountable apparatus. The following background discussions will relate mainly to HMDs, but the principles are also applicable to other types of head-mountable apparatus.

In an HMD, an image or video display device is provided which may be worn on the head or as part of a helmet. Either one eye or both eyes are provided with small electronic display devices.

Some HMDs allow a displayed image to be superimposed on a real-world view. This type of HMD can be referred to as an optical see-through HMD and generally requires the display devices to be positioned somewhere other than directly in front of the users eyes. Some way of deflecting the displayed image so that the user may see it is then required. This might be through the use of a partially reflective mirror placed in front of the user's eyes so as to allow the user to see through the mirror but also to see a reflection of the output of the display devices. In another arrangement, disclosed in EP-A-1 731 943 and US-A-2010/0157433, the entire contents of which documents are incorporated herein by reference, a waveguide arrangement employing total internal reflection is used to convey a displayed image from a display device disposed to the side of the user's head so that the user may see the displayed image but still see a view of the real world through the waveguide. Once again, in either of these types of arrangement, a virtual image of the display is created (using known techniques) so that the user sees the virtual image at an appropriate size and distance to allow relaxed viewing. For example, even though the physical display device may be tiny (for example, 10 mm×10 mm) and may be just a few millimetres from the user's eye, the virtual image may be arranged so as to be perceived by the user at a distance of (for example) 20 m from the user, having a perceived size of 5 m×5 m.

Other HMDs, however, allow the user only to see the displayed images, which is to say that they obscure the real world environment surrounding the user. This type of HMD can position the actual display devices in front of the users eyes, in association with appropriate lenses or other optical components which place a virtual displayed image at a suitable distance for the user to focus in a relaxed manner—for example, at a similar virtual distance and perceived size as the optical see-through HMD described above. This type of device might be used for viewing movies or similar recorded content, or for viewing so-called virtual reality content representing a virtual space surrounding the user. It is of course however possible to display a real-world view on this type of HMD, for example by using a forward-facing camera to generate images for display on the display devices.

Although the original development of HMDs was perhaps driven by the military and professional applications of these devices, HMDs are becoming more popular for use by casual users in, for example, computer game or domestic computing applications.

The foregoing paragraphs have been provided by way of general introduction, and are not intended to limit the scope of the following claims. The described embodiments, together with further advantages, will be best understood by reference to the following detailed description taken in conjunction with the accompanying drawings.

Various aspects and features of the present invention are defined in the appended claims and within the text of the accompanying description and include at least a head mountable apparatus such as a display and a method of operating a head-mountable apparatus as well as a computer program.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 17 schematically illustrates an infrared illumination system;

FIG. 18 is a schematic timing diagram;

FIG. 19 schematically illustrates a camera array;

FIG. 20 schematically illustrates a dual-view camera;

FIG. 21 is a schematic flowchart showing operations of the system of FIG. 17;

FIG. 23 is a schematic flowchart showing operations relating to generating a keyed image;

FIG. 24 is a schematic flowchart showing control based on hand/arm positions; and FIGS. 25 and 26 are schematic timing diagrams.

DESCRIPTION OF THE EMBODIMENTS

Figure 1:
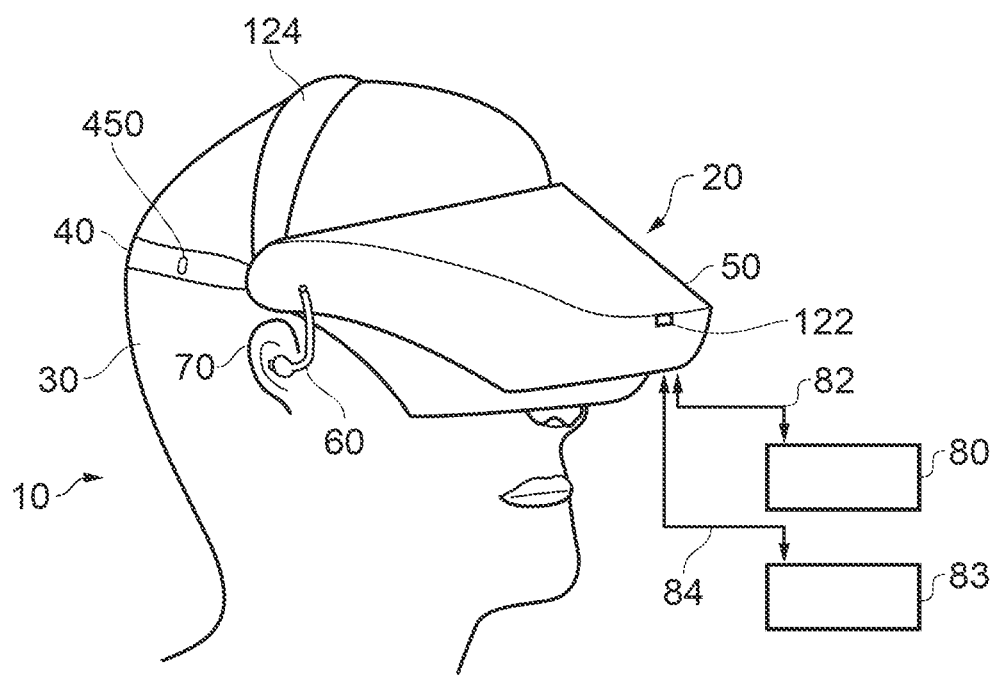
FIG. 1 schematically illustrates an HMD worn by a user.

Referring now to FIG. 1, a user 10 is wearing an HMD 20 (as an example of a generic head-mountable apparatus—other examples (where the technical context allows) including audio headphones or a head-mountable light source) on the users head 30. The HMD comprises a frame 40, in this example formed of a rear strap and a top strap, and a display portion 50.

Note that the HMD of FIG. 1 may comprise further features, to be described below in connection with other drawings, but which are not shown in FIG. 1 for clarity of this initial explanation.

The HMD of FIG. 1 completely (or at least substantially completely) obscures the user's view of the surrounding environment. All that the user can see is the pair of images displayed within the HMD.

The HMD has associated headphone audio transducers or earpieces 60 which fit into the users left and right ears 70. The earpieces 60 replay an audio signal provided from an external source, which may be the same as the video signal source which provides the video signal for display to the users eyes.

The combination of the fact that the user can see only what is displayed by the HMD and, subject to the limitations of the noise blocking or active cancellation properties of the earpieces and associated electronics, can hear only what is provided via the earpieces, mean that this HMD may be considered as a so-called "full immersion" HMD. Note however that in some embodiments the HMD is not a full immersion HMD, and may provide at least some facility for the user to see and/or hear the user's surroundings. This could be by providing some degree of transparency or partial transparency in the display arrangements, and/or by projecting a view of the outside (captured using a camera, for example a camera mounted on the HMD) via the HMD's displays, and/or by allowing the transmission of ambient sound past the earpieces and/or by providing a microphone to generate an input sound signal (for transmission to the earpieces) dependent upon the ambient sound.

A front-facing camera 122 may capture images to the front of the HMD, in use. A Bluetooth® antenna 124 may provide communication facilities or may simply be arranged as a directional antenna to allow a detection of the direction of a nearby Bluetooth transmitter.

In operation, a video signal is provided for display by the HMD. This could be provided by an external video signal source 80 such as a video games machine or data processing apparatus (such as a personal computer), in which case the signals could be transmitted to the HMD by a wired or a wireless connection 82. Examples of suitable wireless connections include Bluetooth® connections. Audio signals for the earpieces 60 can be carried by the same connection. Similarly, any control signals passed from the HMD to the video (audio) signal source may be carried by the same connection. Furthermore, a power supply 83 (including one or more batteries and/or being connectable to a mains power outlet) may be linked by a cable 84 to the HMD. Note that the power supply 83 and the video signal source 80 may be separate units or may be embodied as the same physical unit. There may be separate cables for power and video (and indeed for audio) signal supply, or these may be combined for carriage on a single cable (for example, using separate conductors, as in a USB cable, or in a similar way to a "power over Ethernet" arrangement in which data is carried as a balanced signal and power as direct current, over the same collection of physical wires). The video and/or audio signal may be carried by, for example, an optical fibre cable. In other embodiments, at least part of the functionality associated with generating image and/or audio signals for presentation to the user may be carried out by circuitry and/or processing forming part of the HMD itself. A power supply may be provided as part of the HMD itself.

Some embodiments of the invention are applicable to an HMD having at least one electrical and/or optical cable linking the HMD to another device, such as a power supply and/or a video (and/or audio) signal source. So, embodiments of the invention can include, for example:

(a) an HMD having its own power supply (as part of the HMD arrangement) but a cabled connection to a video and/or audio signal source;

(b) an HMD having a cabled connection to a power supply and to a video and/or audio signal source, embodied as a single physical cable or more than one physical cable;

(c) an HMD having its own video and/or audio signal source (as part of the HMD arrangement) and a cabled connection to a power supply; or (d) an HMD having a wireless connection to a video and/or audio signal source and a cabled connection to a power supply.

If one or more cables are used, the physical position at which the cable 82 and/or 84 enters or joins the HMD is not particularly important from a technical point of view. Aesthetically, and to avoid the cable(s) brushing the user's face in operation, it would normally be the case that the cable(s) would enter or join the HMD at the side or back of the HMD (relative to the orientation of the user's head when worn in normal operation). Accordingly, the position of the cables 82, 84 relative to the HMD in FIG. 1 should be treated merely as a schematic representation.

Accordingly, the arrangement of FIG. 1 provides an example of a head-mountable display system comprising a frame to be mounted onto an observer's head, the frame defining one or two eye display positions which, in use, are positioned in front of a respective eye of the observer and a display element mounted with respect to each of the eye display positions, the display element providing a virtual image of a video display of a video signal from a video signal source to that eye of the observer.

FIG. 1 shows just one example of an HMD. Other formats are possible: for example an HMD could use a frame more similar to that associated with conventional eyeglasses, namely a substantially horizontal leg extending back from the display portion to the top rear of the user's ear, possibly curling down behind the ear. In other (not full immersion) examples, the users view of the external environment may not in fact be entirely obscured; the displayed images could be arranged so as to be superposed (from the user's point of view) over the external environment. An example of such an arrangement will be described below with reference to FIG. 4.

In the example of FIG. 1, a separate respective display is provided for each of the user's eyes. A schematic plan view of how this is achieved is provided as FIG. 2, which illustrates the positions 100 of the users eyes and the relative position 110 of the users nose. The display portion 50, in schematic form, comprises an exterior shield 120 to mask ambient light from the users eyes and an internal shield 130 which prevents one eye from seeing the display intended for the other eye. The combination of the users face, the exterior shield 120 and the interior shield 130 form two compartments 140, one for each eye. In each of the compartments there is provided a display element 150 and one or more optical elements 160. The way in which the display element and the optical element(s) cooperate to provide a display to the user will be described with reference to FIG. 3.

Figure 3:
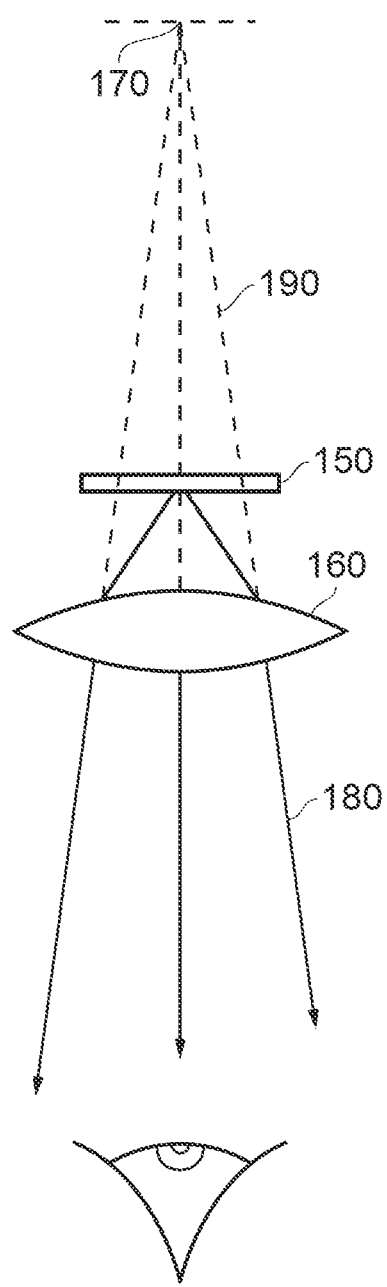
FIG. 3 schematically illustrates the formation of a virtual image by an HMD.

Referring to FIG. 3, the display element 150 generates a displayed image which is (in this example) refracted by the optical elements 160 (shown schematically as a convex lens but which could include compound lenses or other elements) so as to generate a virtual image 170 which appears to the user to be larger than and significantly further away than the real image generated by the display element 150. As an example, the virtual image may have an apparent image size (image diagonal) of more than 1 m and may be disposed at a distance of more than 1 m from the user's eye (or from the frame of the HMD). In general terms, depending on the purpose of the HMD, it is desirable to have the virtual image disposed a significant distance from the user. For example, if the HMD is for viewing movies or the like, it is desirable that the user's eyes are relaxed during such viewing, which requires a distance (to the virtual image) of at least several metres. In FIG. 3, solid lines (such as the line 180) are used to denote real optical rays, whereas broken lines (such as the line 190) are used to denote virtual rays.

Figure 4:
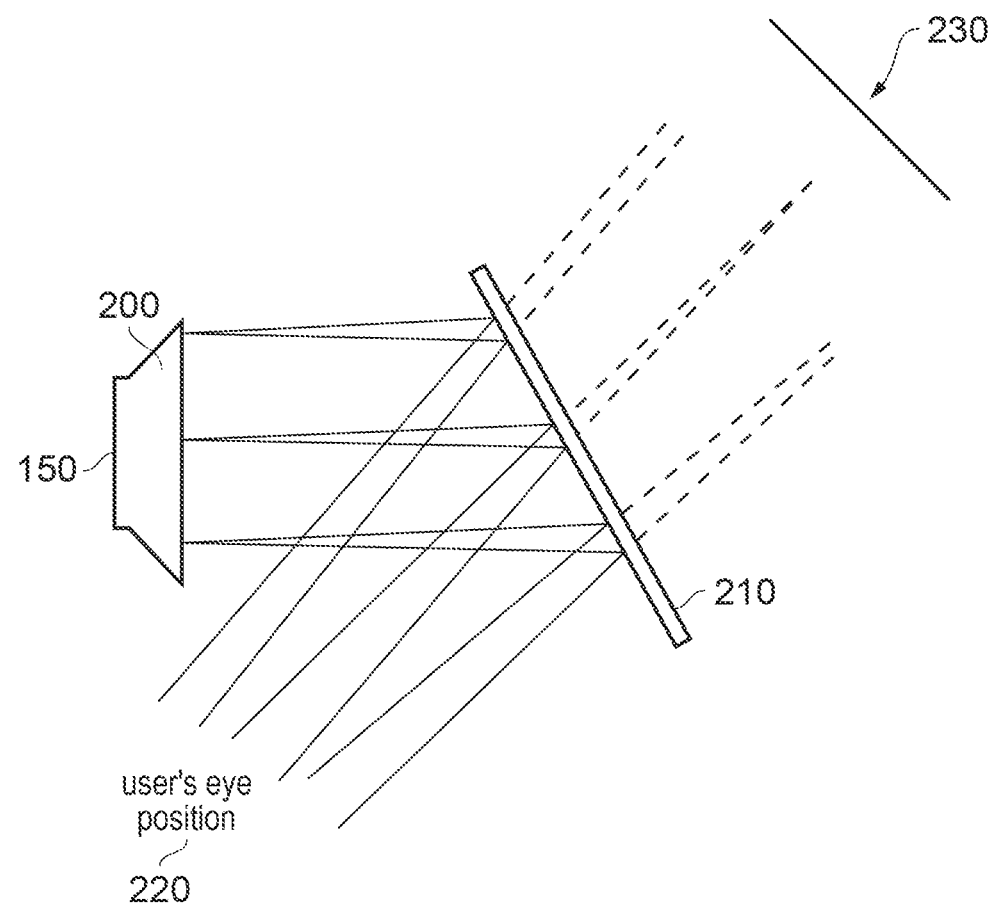
FIG. 4 schematically illustrates another type of display for use in an HMD.

An alternative arrangement is shown in FIG. 4. This arrangement may be used where it is desired that the users view of the external environment is not entirely obscured. However, it is also applicable to HMDs in which the users external view is wholly obscured. In the arrangement of FIG. 4, the display element 150 and optical elements 200 cooperate to provide an image which is projected onto a mirror 210, which deflects the image towards the user's eye position 220. The user perceives a virtual image to be located at a position 230 which is in front of the user and at a suitable distance from the user.

In the case of an HMD in which the users view of the external surroundings is entirely obscured, the mirror 210 can be a substantially 100% reflective mirror. The arrangement of FIG. 4 then has the advantage that the display element and optical elements can be located closer to the centre of gravity of the users head and to the side of the user's eyes, which can produce a less bulky HMD for the user to wear. Alternatively, if the HMD is designed not to completely obscure the user's view of the external environment, the mirror 210 can be made partially reflective so that the user sees the external environment, through the mirror 210, with the virtual image superposed over the real external environment.

Figure 5:
FIG. 5 schematically illustrates a pair of stereoscopic images.

In the case where separate respective displays are provided for each of the user's eyes, it is possible to display stereoscopic images. An example of a pair of stereoscopic images for display to the left and right eyes is shown in FIG. 5. The images exhibit a lateral displacement relative to one another, with the displacement of image features depending upon the (real or simulated) lateral separation of the cameras by which the images were captured, the angular convergence of the cameras and the (real or simulated) distance of each image feature from the camera position.

Note that the lateral displacements in FIG. 5 could in fact be the other way round, which is to say that the left eye image as drawn could in fact be the right eye image, and the right eye image as drawn could in fact be the left eye image. This is because some stereoscopic displays tend to shift objects to the right in the right eye image and to the left in the left eye image, so as to simulate the idea that the user is looking through a stereoscopic window onto the scene beyond. However, some HMDs use the arrangement shown in FIG. 5 because this gives the impression to the user that the user is viewing the scene through a pair of binoculars. The choice between these two arrangements is at the discretion of the system designer.

In some situations, an HMD may be used simply to view movies and the like. In this case, there is no change required to the apparent viewpoint of the displayed images as the user turns the user's head, for example from side to side. In other uses, however, such as those associated with virtual reality (VR) or augmented reality (AR) systems, the user's viewpoint needs to track movements with respect to a real or virtual space in which the user is located.

Figure 6:
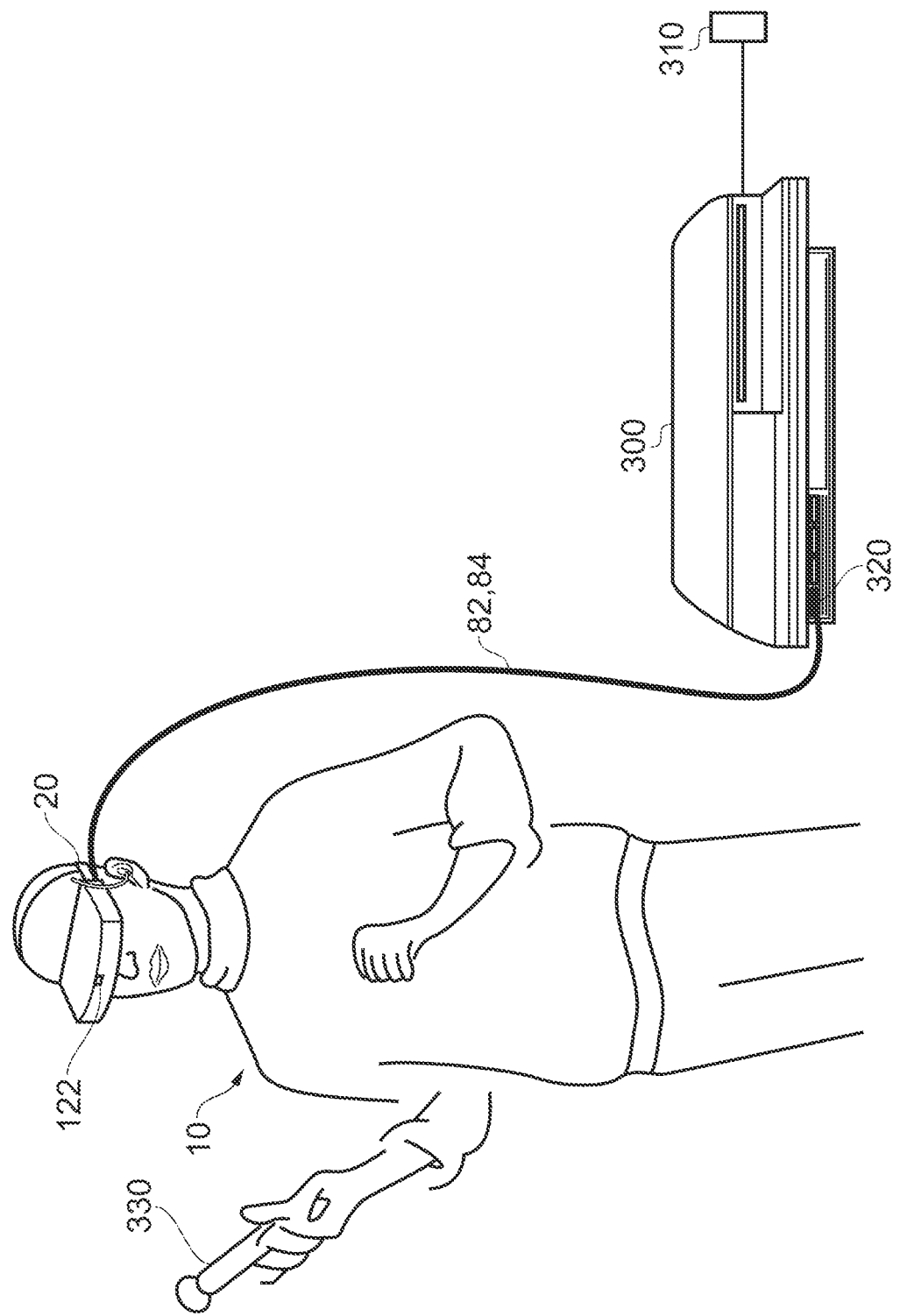
FIGS. 6 and 7 schematically illustrate a user wearing an HMD connected to a Sony® PlayStation 3® games console.

FIG. 6 schematically illustrates a user wearing an HMD connected to a Sony® PlayStation 3® games console 300 as an example of a base device. Another examples is a Sony® PlayStation 4® games console. The games console 300 is connected to a mains power supply 310 and (optionally) to a main display screen (not shown). A cable, acting as the cables 82, 84 discussed above (and so acting as both power supply and signal cables), links the HMD 20 to the games console 300 and is, for example, plugged into a USB socket 320 on the console 300. Note that in the present embodiments, a single physical cable is provided which fulfils the functions of the cables 82, 84. In FIG. 6, the user is also shown holding a hand-held controller 330 which may be, for example, a Sony® Move® controller which communicates wirelessly with the games console 300 to control (or to contribute to the control of) game operations relating to a currently executed game program.

The video displays in the HMD 20 are arranged to display images generated by the games console 300, and the earpieces 60 in the HMD 20 are arranged to reproduce audio signals generated by the games console 300. Note that if a USB type cable is used, these signals will be in digital form when they reach the HMD 20, such that the HMD 20 comprises a digital to analogue converter (DAC) to convert at least the audio signals back into an analogue form for reproduction.

Images from the camera 122 mounted on the HMD 20 are passed back to the games console 300 via the cable 82, 84. Similarly, if motion or other sensors are provided at the HMD 20, signals from those sensors may be at least partially processed at the HMD 20 and/or may be at least partially processed at the games console 300. The use and processing of such signals will be described further below.

The USB connection from the games console 300 also provides power to the HMD 20, according to the USB standard.

Figure 7:
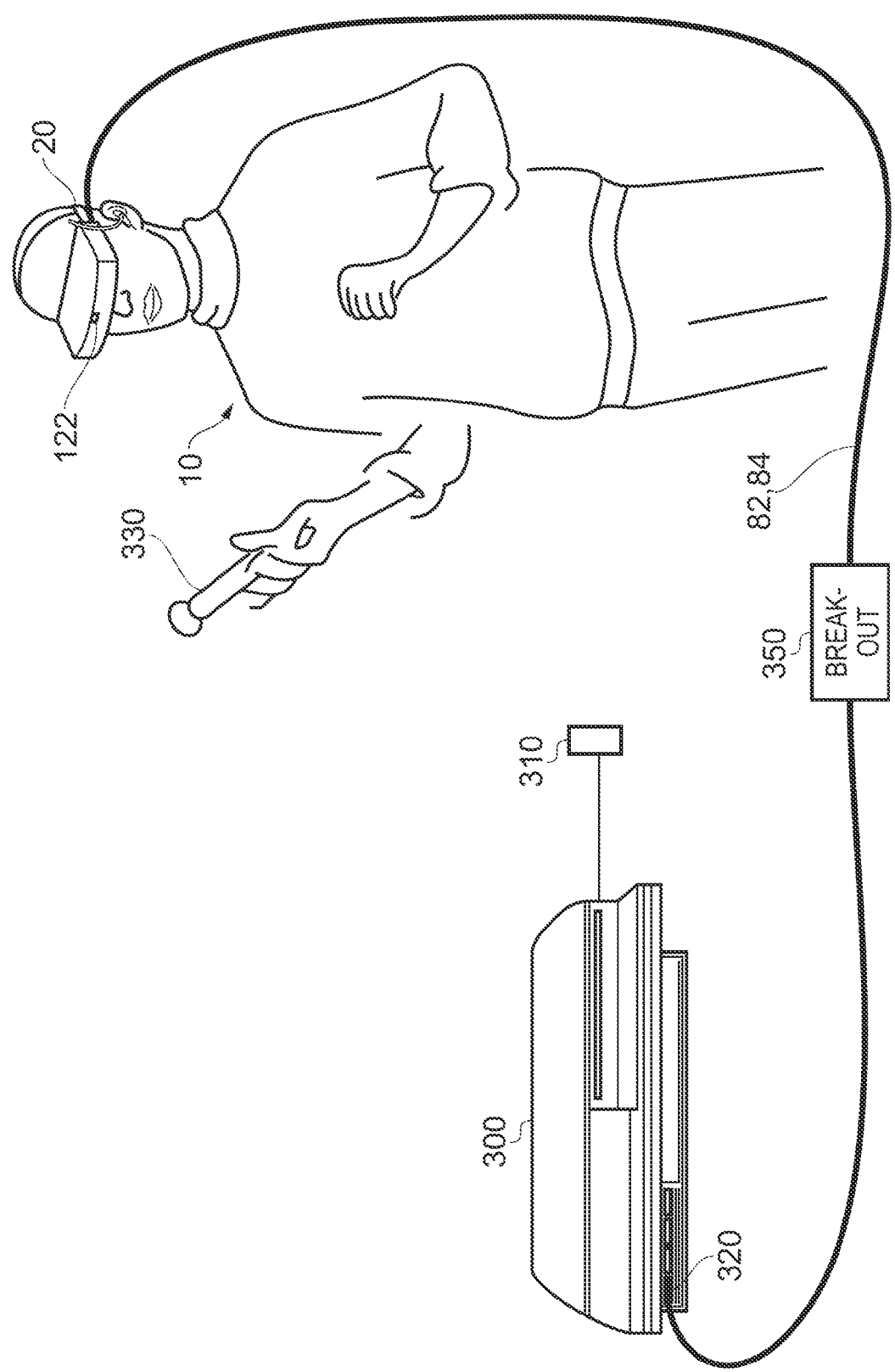

FIG. 7 schematically illustrates a similar arrangement in which the games console is connected (by a wired or wireless link) to a so-called "break out box" acting as a base or intermediate device 350, to which the HMD 20 is connected by a cabled link 82,84. The breakout box has various functions in this regard. One function is to provide a location, near to the user, for some user controls relating to the operation of the HMD, such as (for example) one or more of a power control, a brightness control, an input source selector, a volume control and the like. Another function is to provide a local power supply for the HMD (if one is needed according to the embodiment being discussed). Another function is to provide a local cable anchoring point. In this last function, it is not envisaged that the break-out box 350 is fixed to the ground or to a piece of furniture, but rather than having a very long trailing cable from the games console 300, the break-out box provides a locally weighted point so that the cable 82, 84 linking the HMD 20 to the break-out box will tend to move around the position of the break-out box. This can improve user safety and comfort by avoiding the use of very long trailing cables.

It will be appreciated that the localisation of processing in the various techniques described in this application can be varied without changing the overall effect, given that an HMD may form part of a set or cohort of interconnected devices (that is to say, interconnected for the purposes of data or signal transfer, but not necessarily connected by a physical cable). So, processing which is described as taking place "at" one device, such as at the HMD, could be devolved to another device such as the games console (base device) or the break-out box. Processing tasks can be shared amongst devices. Source signals, on which the processing is to take place, could be distributed to another device, or the processing results from the processing of those source signals could be sent to another device, as required. So any references to processing taking place at a particular device should be understood in this context. Similarly, where an interaction between two devices is basically symmetrical, for example where a camera or sensor on one device detects a signal or feature of the other device, it will be understood that unless the context prohibits this, the two devices could be interchanged without any loss of functionality.

As mentioned above, in some uses of the HMD, such as those associated with virtual reality (VR) or augmented reality (AR) systems, the user's viewpoint needs to track movements with respect to a real or virtual space in which the user is located.

This tracking is carried out by detecting motion of the HMD and varying the apparent viewpoint of the displayed images so that the apparent viewpoint tracks the motion.

Figure 8:
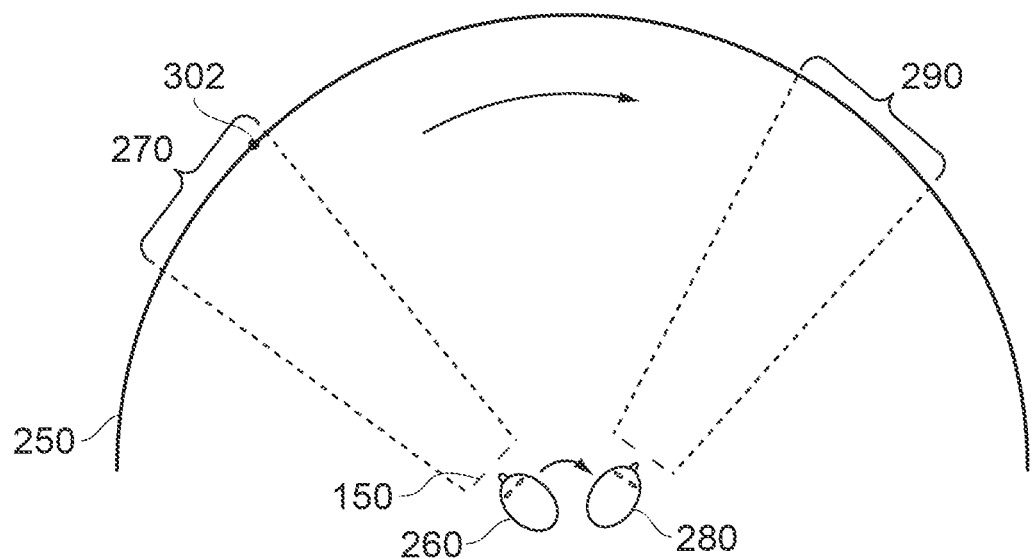
FIG. 8 schematically illustrates a change of view of user of an HMD.

FIG. 8 schematically illustrates the effect of a user head movement in a VR or AR system.

Referring to FIG. 8, a virtual environment is represented by a (virtual) spherical shell 250 around a user. Because of the need to represent this arrangement on a two-dimensional paper drawing, the shell is represented by a part of a circle, at a distance from the user equivalent to the separation of the displayed virtual image from the user. A user is initially at a first position 260 and is directed towards a portion 270 of the virtual environment. It is this portion 270 which is represented in the images displayed on the display elements 150 of the user's HMD.

Consider the situation in which the user then moves his head to a new position and/or orientation 280. In order to maintain the correct sense of the virtual reality or augmented reality display, the displayed portion of the virtual environment also moves so that, at the end of the movement, a new portion 290 is displayed by the HMD.

So, in this arrangement, the apparent viewpoint within the virtual environment moves with the head movement. If the head rotates to the right side, for example, as shown in FIG. 8, the apparent viewpoint also moves to the right from the user's point of view. If the situation is considered from the aspect of a displayed object, such as a displayed object 300, this will effectively move in the opposite direction to the head movement. So, if the head movement is to the right, the apparent viewpoint moves to the right but an object such as the displayed object 300 which is stationary in the virtual environment will move towards the left of the displayed image and eventually will disappear off the left-hand side of the displayed image, for the simple reason that the displayed portion of the virtual environment has moved to the right whereas the displayed object 300 has not moved in the virtual environment.

Figure 2:
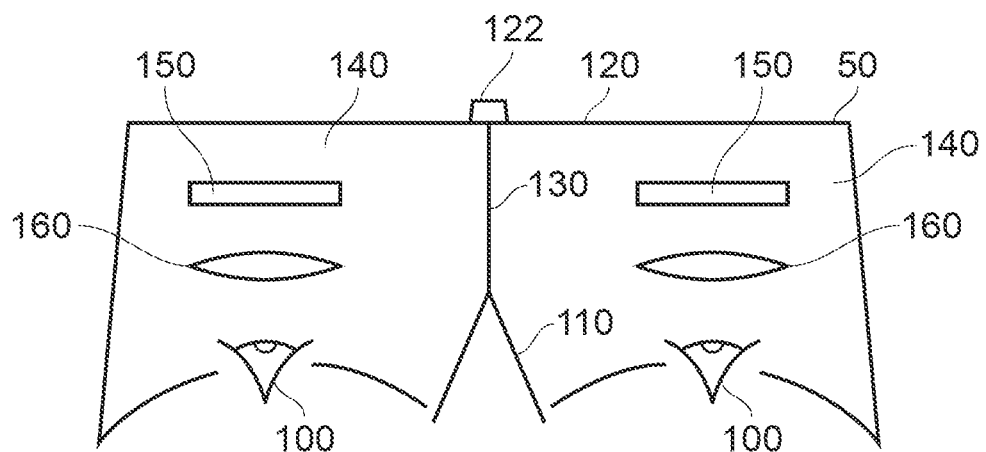
FIG. 2 is a schematic plan view of an HMD.
Figure 9A:
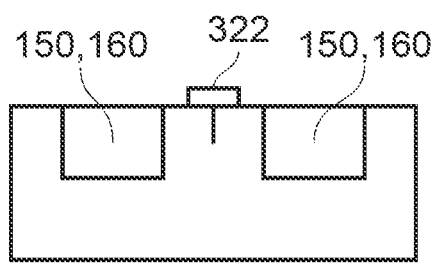
FIGS. 9a and 9b schematically illustrate HMDs with motion sensing.
Figure 9B:
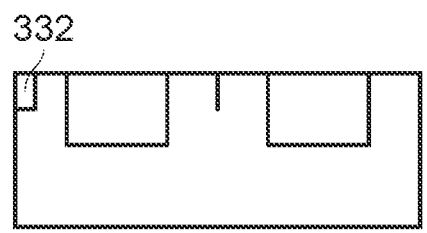

FIGS. 9a and 9b schematically illustrated HMDs with motion sensing. The two drawings are in a similar format to that shown in FIG. 2. That is to say, the drawings are schematic plan views of an HMD, in which the display element 150 and optical elements 160 are represented by a simple box shape. Many features of FIG. 2 are not shown, for clarity of the diagrams. Both drawings show examples of HMDs with a motion detector for detecting motion of the observer's head.

In FIG. 9a, a forward-facing camera 322 is provided on the front of the HMD. This may be the same camera as the camera 122 discussed above, or may be an additional camera. This does not necessarily provide images for display to the user (although it could do so in an augmented reality arrangement). Instead, its primary purpose in the present embodiments is to allow motion sensing. A technique for using images captured by the camera 322 for motion sensing will be described below in connection with FIG. 10. In these arrangements, the motion detector comprises a camera mounted so as to move with the frame; and an image comparator operable to compare successive images captured by the camera so as to detect inter-image motion.

FIG. 9b makes use of a hardware motion detector 332. This can be mounted anywhere within or on the HMD. Examples of suitable hardware motion detectors are piezo-electric accelerometers or optical fibre gyroscopes. It will of course be appreciated that both hardware motion detection and camera-based motion detection can be used in the same device, in which case one sensing arrangement could be used as a backup when the other one is unavailable, or one sensing arrangement (such as the camera) could provide data for changing the apparent viewpoint of the displayed images, whereas the other (such as an accelerometer) could provide data for image stabilisation.

Figure 10:
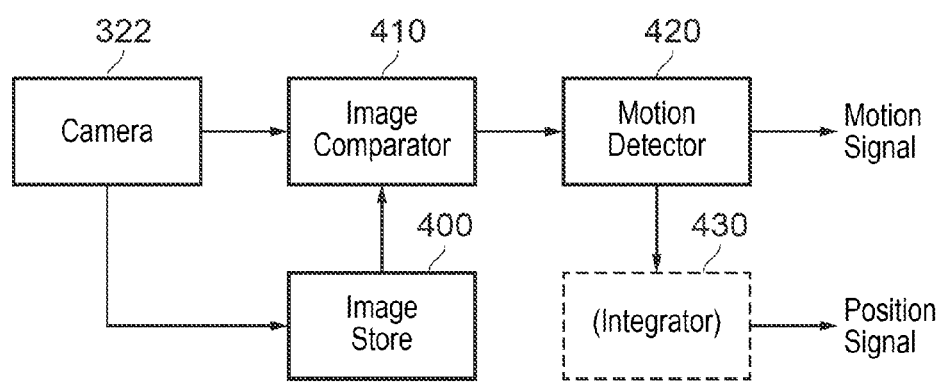
FIG. 10 schematically illustrates a position sensor based on optical flow detection.

FIG. 10 schematically illustrates one example of motion detection using the camera 322 of FIG. 9a.

The camera 322 is a video camera, capturing images at an image capture rate of, for example, 25 images per second. As each image is captured, it is passed to an image store 400 for storage and is also compared, by an image comparator 410, with a preceding image retrieved from the image store. The comparison uses known block matching techniques (so-called "optical flow" detection) to establish whether substantially the whole image has moved since the time at which the preceding image was captured. Localised motion might indicate moving objects within the field of view of the camera 322, but global motion of substantially the whole image would tend to indicate motion of the camera rather than of individual features in the captured scene, and in the present case because the camera is mounted on the HMD, motion of the camera corresponds to motion of the HMD and in turn to motion of the user's head.

The displacement between one image and the next, as detected by the image comparator 410, is converted to a signal indicative of motion by a motion detector 420. If required, the motion signal is converted by to a position signal by an integrator 430.

As mentioned above, as an alternative to, or in addition to, the detection of motion by detecting inter-image motion between images captured by a video camera associated with the HMD, the HMD can detect head motion using a mechanical or solid state detector 332 such as an accelerometer. This can in fact give a faster response in respect of the indication of motion, given that the response time of the video-based system is at best the reciprocal of the image capture rate. In some instances, therefore, the detector 332 can be better suited for use with higher frequency motion detection. However, in other instances, for example if a high image rate camera is used (such as a 200 Hz capture rate camera), a camera-based system may be more appropriate. In terms of FIG. 10, the detector 332 could take the place of the camera 322, the image store 400 and the comparator 410, so as to provide an input directly to the motion detector 420. Or the detector 332 could take the place of the motion detector 420 as well, directly providing an output signal indicative of physical motion.

Other position or motion detecting techniques are of course possible. For example, a mechanical arrangement by which the HMD is linked by a moveable pantograph arm to a fixed point (for example, on a data processing device or on a piece of furniture) may be used, with position and orientation sensors detecting changes in the deflection of the pantograph arm. In other embodiments, a system of one or more transmitters and receivers, mounted on the HMD and on a fixed point, can be used to allow detection of the position and orientation of the HMD by triangulation techniques. For example, the HMD could carry one or more directional transmitters, and an array of receivers associated with known or fixed points could detect the relative signals from the one or more transmitters. Or the transmitters could be fixed and the receivers could be on the HMD. Examples of transmitters and receivers include infrared transducers, ultrasonic transducers and radio frequency transducers. The radio frequency transducers could have a dual purpose, in that they could also form part of a radio frequency data link to and/or from the HMD, such as a Bluetooth® link.

Figure 11:
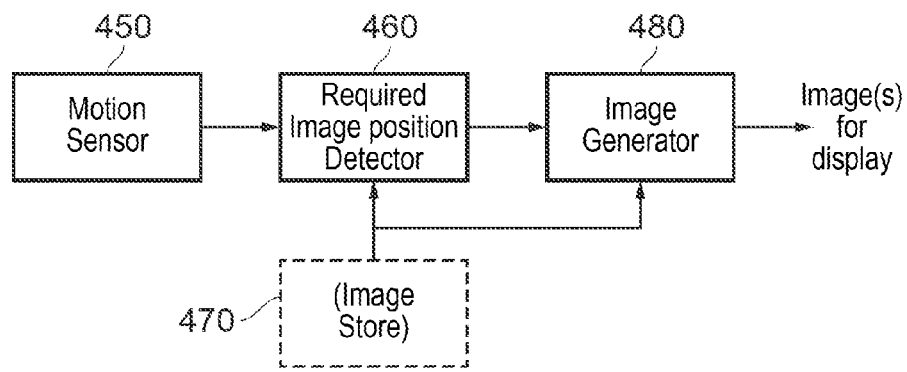
FIG. 11 schematically illustrates the generation of images in response to HMD position or motion detection.

FIG. 11 schematically illustrates image processing carried out in response to a detected position or change in position of the HMD.

As mentioned above in connection with FIG. 10, in some applications such as virtual reality and augmented reality arrangements, the apparent viewpoint of the video being displayed to the user of the HMD is changed in response to a change in actual position or orientation of the user's head.

With reference to FIG. 11, this is achieved by a motion sensor 450 (such as the arrangement of FIG. 10 and/or the motion detector 332 of FIG. 9b) supplying data indicative of motion and/or current position to a required image position detector 460, which translates the actual position of the HMD into data defining the required image for display. An image generator 480 accesses image data stored in an image store 470 if required, and generates the required images from the appropriate viewpoint for display by the HMD. The external video signal source can provide the functionality of the image generator 480 and act as a controller to compensate for the lower frequency component of motion of the observer's head by changing the viewpoint of the displayed image so as to move the displayed image in the opposite direction to that of the detected motion so as to change the apparent viewpoint of the observer in the direction of the detected motion.

Figure 12:
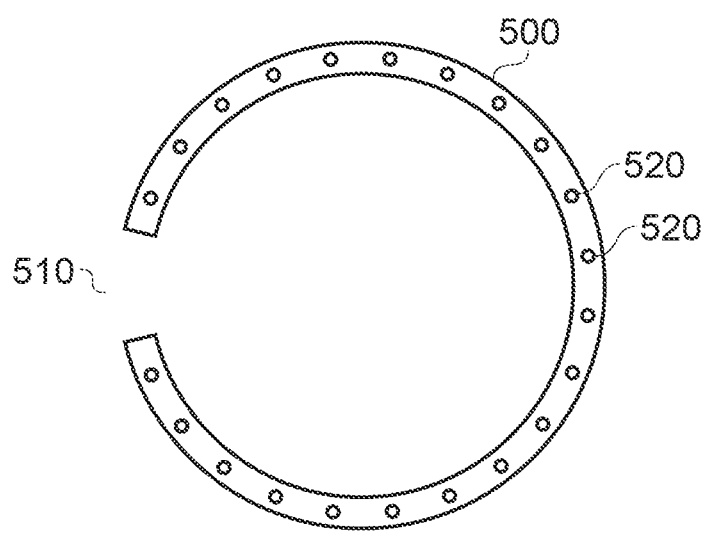
FIG. 12 schematically illustrates an example peripheral device as viewed by the camera of the HMD.

FIG. 12 schematically illustrates an example peripheral device as viewed by the camera of the HMD for example by using the forward facing camera 122 or 322.

In this example, the peripheral device is a steering wheel 500 for use by the user in playing (for example) a driving game or the like. The steering wheel may have electronic sensors to detect its rotational position, with that information being transmitted back to the HMD, the break-out box or the games console as telemetry data. The transmitted position can then be used as part of the controls of the game functionality. However, in other arrangements, the rotational position may be detected optically. This will be described below.

A feature of the captured images of the steering wheel, such as that shown in FIG. 12, is that the wheel has a gap 510. As it is drawn in FIG. 12, the gap is simply shown as a missing portion of the steering wheel 500. However, in a real image, the 510 would be filled with other image material, such that a "gap" is simply defined as a portion of the image where the wheel is expected but is not found to be present. In other words, the gap represents an occlusion of the steering wheel from the point of view of the HMD camera. The physical steering wheel control is a continuous annulus of (for example) plastics material.

The occlusion of the steering wheel can be detected by known image processing techniques which detect the presence of the circular pattern corresponding to the annular shape of the wheel, and detect missing portions of that circular pattern. In other embodiments, the steering wheel may be provided with passive markings or illuminations 520 which can be used as part of the image processing function to detect the shape of the steering wheel and also the occlusion brackets as represented by the non-detection of one or more of the expected passive markings or illuminations 520.

The passive markings or illuminations 520 can also be used to allow detection of the rotational position of the steering wheel 500 from the captured images. In some embodiments, the markings or illuminations may be identical with one another, and are tracked (in terms of their rotational position in the image) from image to image. This gives an indication of the rotational movement of the steering wheel control but not its absolute position. In other embodiments, at least some of the markings or illuminations may be distinguishable from one another in a captured image, such that the absolute rotational position may be detected from the positions of the markings or illuminations in the captured image.

In the present embodiments, the occlusion 510 may be assumed to represent the position at which the user is holding the physical steering wheel control with the users hand. In turn, the system (of the HMD, the games console and optionally the break-out box) renders a virtual version of the steering wheel control, with a virtual hand and arm rendered at the appropriate position.

Figure 13:
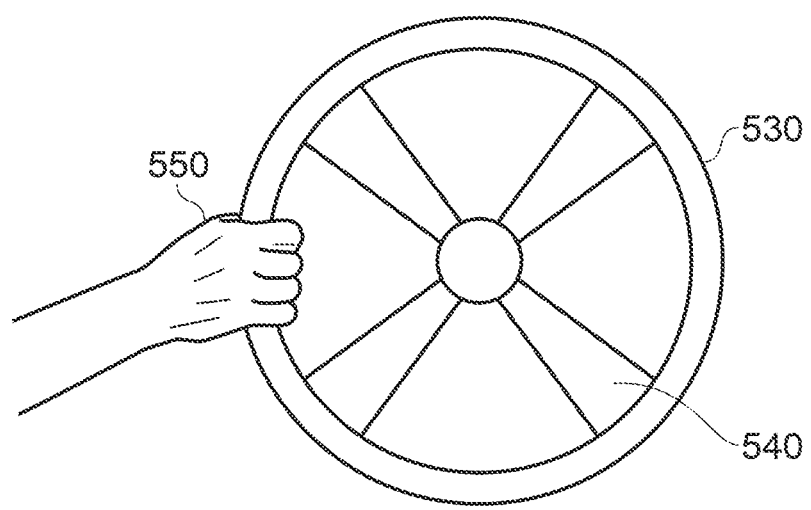
FIG. 13 schematically illustrates a version of the peripheral of FIG. 12 as rendered for display to the HMD user.

FIG. 13 schematically illustrates a version 530 of the peripheral of FIG. 12 as rendered for display to the HMD user. The virtual steering wheel 530 can be rendered to include virtual features (such as decorative spokes 540) not present in the physical steering wheel control. At the position of the occlusion 510, a virtual hand and arm 550 are rendered. If the occlusion is on the left-hand side of the physical steering wheel, a left hand and arm are rendered. If the occlusion is on the right-hand side of the physical steering wheel, a right hand and arm are rendered. If the occlusion is in a region at the top or the bottom of the steering wheel, then the decision as to which hand should be rendered can be based upon either or both of (a) information relating to the current user indicating the current users dominant hand (for example, acquired as part of a control setup and calibration operation), and (b) the current direction of rotational movement of the steering wheel, so that if the physical steering wheel is moving clockwise, a hand at the top of the wheel is considered to be a right-hand, whereas a hand at the bottom of the wheel is considered to be a left-hand, with the opposite applying in the case of anti-clockwise motion.

Because the forward-facing camera 122/322 of the HMD has a fixed spatial relationship to the displays of the HMD, it is possible for the system to render the virtual steering wheel at a realistic image position, which is to say that the virtual steering wheel appears, in the displayed images, at substantially the same position that the real steering wheel would appear if the user were not wearing the HMD.

To deal with possible false occlusions, for example caused by intervening objects blocking the HMD camera's view of the steering wheel, the physical steering wheel peripheral control may have an array of touch or pressure sensors disposed around the periphery of the wheel 500 to detect the presence of a hand touching the wheel at that position. Data from the sensors may be transmitted from the peripheral device to the HMD as part of the peripheral device's telemetry data. If the camera images indicate an occlusion but the wheel sensors do not indicate the presence of a hand, then the system does not render a hand and arm.

Another way to detect false occlusions is to use another camera, for example mounted with respect to the break-out box, to view the steering wheel peripheral, with images from that other camera being image-processed to detect the users arms and hands contacting the steering wheel.

A further way of detecting false occlusions, and indeed of detecting whether the system has incorrectly located or detected a touch of any peripheral, is to assume that only two hands are involved in the playing of the game (that is to say, the user is not being assisted by another person to operate the controls). Accordingly, if a button or joystick control is detected such that both of the user's hands are occupied by operating other controls, the system can treat the occlusion of the steering wheel as a false occlusion and not render the hand or arm.

Figure 14:
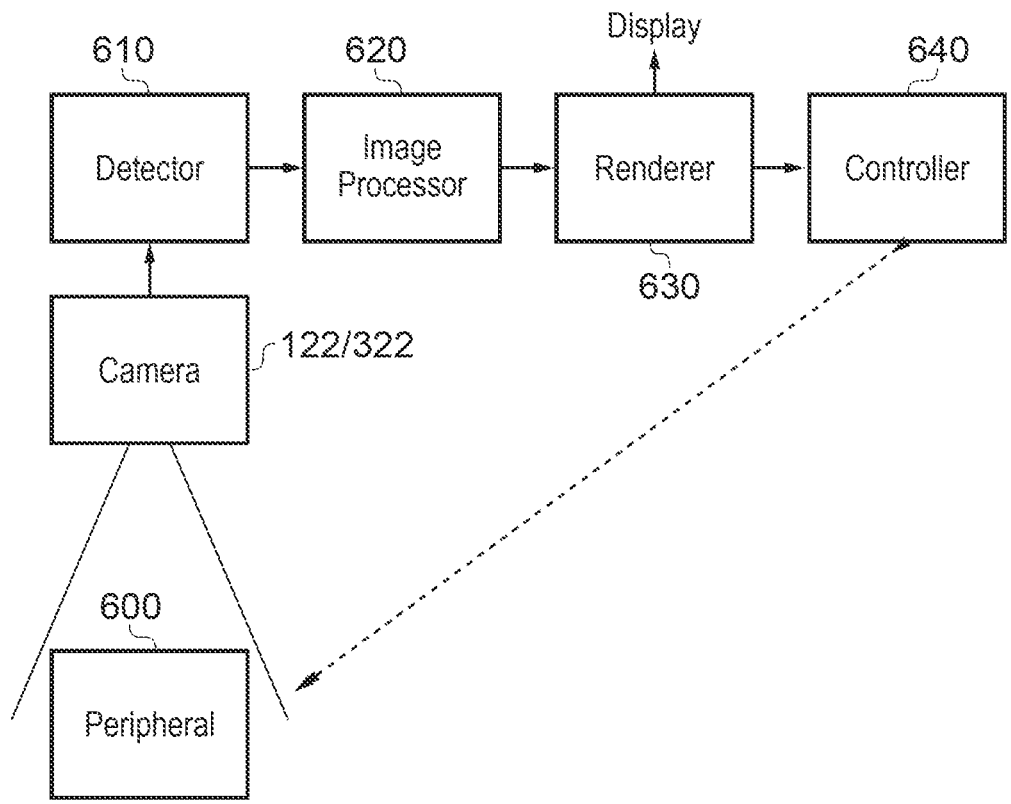
FIG. 14 schematically illustrates part of the functionality of an HMD.

FIG. 14 schematically illustrates part of the functionality of an HMD.

The HMD comprises a forward-facing camera 122/322 as discussed above, and this camera is, in the present arrangement, viewing a peripheral control device 600 disposed in front of the user. An example of such a peripheral control device is a steering wheel as discussed above, but many other such devices may be considered, such as a weapon, a bat or racquet, a gearstick, a handlebar and the like.

Images captured by the camera 122/322 are supplied to a detector 610 and an image processor 620. These devices share the functionality of deriving detail from the image in the manner discussed above. In one example, the detector 610 is operable to detect the general location of the peripheral device by shape matching and/or detecting markers or illuminations associated with the device, and the image processor 620 is operable to detect movements of the device and occlusions of it.

The image processor 620 passes information to a renderer 630 which generates a virtual version of the peripheral for display to the user. Note that although this would normally be a virtual representation of the same type of control device as the physical control, this need not be the case. So, the peripheral could be a simple hand-held structure similar perhaps to the Sony® PlayStation® Move™ controller, but the rendered image could take on various different shapes such as a bat, racquet, weapon and the like, rendered at the detected position of the peripheral.

The renderer 630 is operable to render additional features such as a hand and arm at the position of a detected occlusion of the peripheral 600, unless that occlusion is detected (as discussed above) to be a false occlusion.

As a further optional feature, a controller 640 may send control data to the peripheral 600 in dependence upon the detection of an occlusion. If an occlusion is detected, the controller 640 controls the peripheral 600 to use haptic feedback for the user, such as vibration or rumble device is within the peripheral 600. If no occlusion is detected, such that it may be assumed that the user is not touching the peripheral 600, the controller 640 controls the peripheral 600 not to use such haptic feedback, in order to save peripheral battery power.

Figure 15:
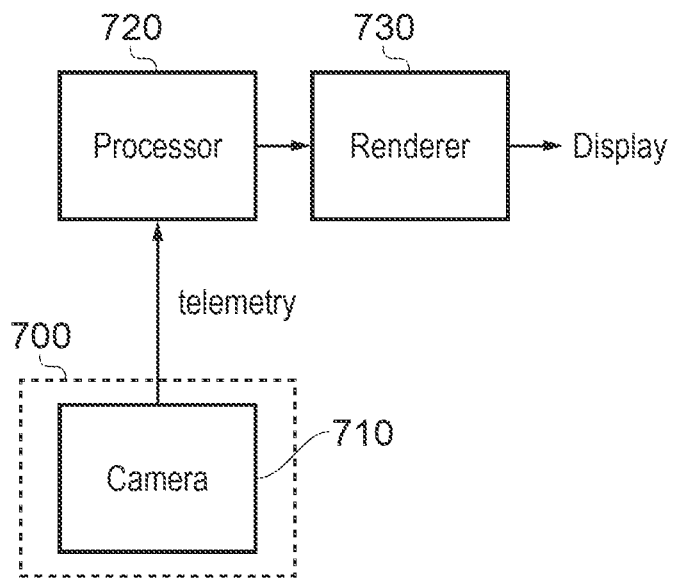
FIG. 15 schematically illustrates part of the functionality of a hand held peripheral device.

The arrangements discussed above assume that the camera is provided as part of the HMD. FIG. 15 schematically illustrates part of the functionality of a hand held peripheral device 700 which makes use of a camera 710 associated with the handheld peripheral device. Note that the peripheral device may be a specific gaming device such as a steering wheel control or a hand-held game controller such as the Sony Six-axis® controller, or may be, for example, a generic device such as a mobile telephone.

In operation, the camera 710 of the peripheral device captures images of the HMD, assuming the peripheral device is held by the user in front of the HMD, and either processes those images itself or (as shown in FIG. 15) passes data relating to those images by telemetry (for example, wireless telemetry) to a processor 720 associated with the HMD. The processor 720 detects the position of the peripheral device 700 with respect to the HMD and passes data to a renderer 730 which renders a virtual version of the peripheral device at the appropriate position according to the data received from the processor 720.

Note that the arrangement shown in FIG. 15 can be used in order for the relative position of the HMD and the break-out box to be established, but in this instance, the camera 710 would be the HMD camera or a camera associated with the break-out box, and the presence in a captured image of the other of the HMD and the break-out box is detected.

Figure 16:
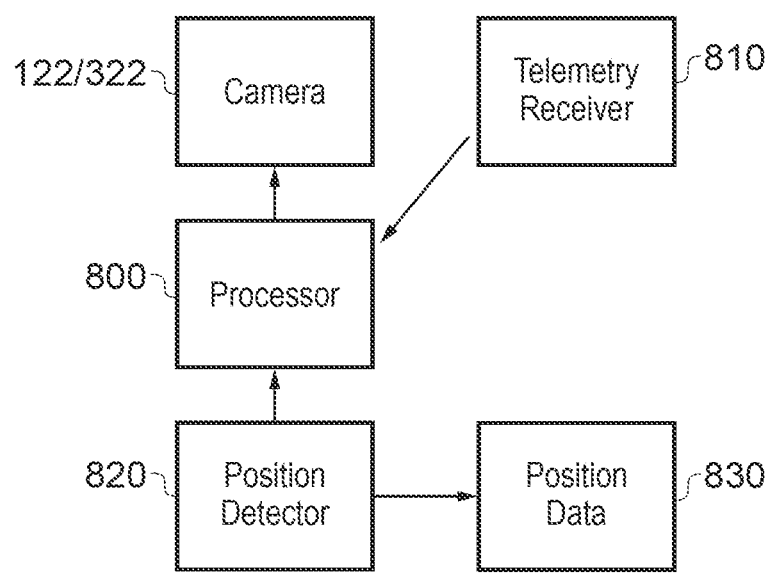
FIG. 16 schematically illustrates an arrangement for position detection of a peripheral device.

FIG. 16 schematically illustrates an arrangement for position detection of a peripheral device. This example shows detection by the camera 122/322 of the HMD, but would be equally applicable to detection by a camera associated with the break-out box. In FIG. 16, the camera 122/322 provides captured images, and a processor 800 detects the presence of a peripheral device in the captured images. The processor 800 also receives data from a telemetry receiver 810, the data originating from the peripheral device detected in the captured images. A position detector 820 detects the position, relative to the HMD, of the peripheral device. The primary detection is from the captured images, but the telemetry data from the telemetry receiver 810 is used to reinforce the position detection. This is done by detecting whether the telemetry data indicates that the user is touching any controls associated with the peripheral device. If so, the position detector 820 determines that the peripheral device is not out of the users reach, or in other words it must be within about 1 m of the HMD. If the position is detected from the captured images conflicts with that assertion, then the position detector 820 either does not output position data 830 relating to that peripheral or alternatively flags the detected position data 832 indicate that it is potentially incorrect.

Note that if multiple peripheral devices are present, each device could detect the relative position of one or more other devices (including the HMD within the group of devices).

Further techniques to allow the system to detect and model the position of the users arms, the users hands and a hand-held peripheral will now be discussed.

FIG. 17 schematically illustrates an infrared illumination system forming part of the HMD. An infrared light source 900 and a camera 910 (which may be the camera 122/322 or another camera as discussed below) are under the control of a timing generator 920. An image processor 930 receives images from the camera 910.

The basic principle underlying this arrangement is that the infrared light source 900 provides illumination of the approximate field of view of the HMD camera, but at a level of illumination which means that only objects within a relatively short range of the infrared light source 900 are illuminated. For example, this range could be approximately 1-2 m. This means that an infrared camera (the camera 910) will detect objects within the short range, because those objects are illuminated by the infrared light source, but will tend not to detect any objects further away than the short range. Accordingly, the combination of the infrared light source 900 and the camera 910 can give image data which indicates which objects, of the general scene as viewed by the HMD, within the short range. In a typical situation in which a hand-held peripheral is being operated, such objects may be the user's arms and hands and the peripheral itself. So, this technique provides a way of excluding the background or ambient scene from the image captured by the camera 910.

In a simple embodiment, the image captured by the camera 910 may be used how to generate key data in order to derive conventional coloured images of the user's hands and arms from the captured images from a visible light camera forming part of the HMD.

However, a potential complication is that the infrared illumination may affect those visible light images.

One measure which can be taken is to provide an infrared filter for the visible light camera so that the infrared illumination does not affect the visible light images.

Another measure which can be taken, which also allows the use of a single camera rather than two cameras, is a time division arrangement between infrared image capture and visible light image capture. FIG. 18 is a schematic timing diagram illustrating an example of such an arrangement.

In FIG. 18, time is shown from left to right, and each block 950 (of which five blocks are shown as part of a time series) may corresponds to an image capture period such as ⅟₆₀ second. (However, the period of time represented by the box 950 may be different to that of a single image capture period, and it is not a requirement that each of the box 950 represents the same time period; alternate blocks could in fact represent alternate ones of a pair of time periods such as ⅟₆₀ s and ⅟₃₀ s).

During a first time period 960 of FIG. 18, the infrared illumination provided by the infrared light source 900 is "on", under the control of the timing generator 920. During that time period 960, the camera 910 captures an infrared-illuminated image indicative of the foreground view. Accordingly, this image is likely to include the user's hands, arms and peripheral control. However, this image is not suitable for display to the user of the HMD, for the simple reasons that (a) it is an infrared image and so would be displayed in monochrome to the user, and (b) it omits the background or ambient scene. However, this image is used by the image processor 930 to provided so-called key data to indicate which parts of a visible light image contain foreground material.

During a next time period 970, the infrared illumination provided by the infrared light source 900 is turned off, under the control of the timing generator 920. During this time period 970, the camera 910 captures a visible light image of the scene. The visible light image is therefore not distorted or affected by the infrared illumination, and it was also noted that the visible light image contains not only foreground material but also background material. As discussed, images of foreground features such as the user's hands, arms and peripheral control are extracted from the visible light image and may be keyed into an image rendered for display to the user of the HMD, for example by using those portions of the visible light image which correspond to objects detected with at least a threshold illumination in the infrared image, optionally with smoothing applied to the location of detected edges of such keyed regions, or may be used to assist in the rendering of virtual representations of the user's hands, arms and peripheral control.

The sequence then continues with an infrared-illuminated image followed by a visible light image and so on.

Note that the capture periods of either set of images do not need to occupy the whole of the available periods shown in FIG. 18. The capture period of the visible light images could, for example, be set to start just after (say, 1 mS after) the end of the period of infrared illumination, so as to allow the infrared source time to switch off and decay in brightness. The visible light image could be captured according to an exposure period determined using known techniques according to the ambient lighting conditions (which may be supplemented by further visible light illumination provided by the HMD, for example). In some examples, the next infrared illumination period could be set to start a certain time (say, 1 mS) after the end of the variable length visible light exposure period. Or the schedule of infrared illumination could be fixed, such that the exposure period of the visible light image could in principle be rather shorter than the time gap between successive infrared illumination periods, but is also constrained so as not to extend into the next infrared illumination period (for example, being constrained so as to end, say, no later than 1 mS before the next scheduled infrared illumination period.

As discussed, the periods during which the infrared-illuminated images are captured may be different to the periods for during which the visible light images are captured. For example, infrared illumination may be used for ⅟₃₀ s, followed by a period of ⅟₆₀ s during which visible light images are captured, taking into account the different sensitivities of the respective camera operations.

Other options are possible. For example, multiple visible light images may be captured between successive infrared images. For example infrared illumination may be used for ⅟₃₀ s, followed by two successive periods of ⅟₆₀ s during which visible light images are captured.

Accordingly, the timing generator 920 is operable: (a) to provide an on-off timing signal to the infrared light source 900; (b) to signal to the camera 910 and to the image processor 930 the timing of those periods during which the scene is illuminated by infrared illumination and the periods during which the scene is not illuminated by infrared illumination.

The arrangements described above allow the users hands and arms to be detected as foreground objects and then used in various ways, such as the keying those features into a rendered image for display to the HMD user, extracting colour or texture information from the user's features in order to control the rendering of a virtual representation of those features, and/or detecting the orientation or position of the user's hands or arms as part of a detection of the user's control operation.

The distance of a feature from the infrared camera can be detected by the intensity of reflected light is picked up for that feature. Because the infrared illumination is relatively weak and provides a usable image over a short range of maybe 1-2 m, there will be a significant illumination gradient as between foreground features which are very close to the camera and foreground features which are nearer to the extreme of the range of the illumination. The distance of a particular feature from the camera can therefore be established by detecting its illumination reflection.

A suitable infrared light source may be one or more infrared LEDs. Although the range of illumination of such a light source may be considered to continue (in principle) to infinity, a practical indication of the "range" of illumination, when used in conjunction with the infrared camera, is to consider the distance at which (say) a 100% reflective object would have an apparent illumination of less than the minimum sensitivity of the camera. So, in this context, a finite "range" may be attributed to the light source and camera arrangement, perhaps of 1-2 m as discussed earlier.

As discussed, a single camera may be used as the camera 910, or multiple cameras may be used such that they have different sensitivities: one could be sensitive to infrared illumination but not to visible light illumination, and the other could be sensitive to visible light illumination but not to infrared illumination.

Further options for the camera 910 will now be discussed.

FIG. 19 schematically illustrates a camera array, for example a so-called a light-field camera, also referred to as a plenoptic camera, which uses a micro lens array to capture so-called light-field information about a scene. In particular, FIG. 19 schematically illustrates an array of 4×4 lenses 980 of such a camera. These cameras are described in the following reference: en.wikipedia.org/wiki/Light-field_camera, the entire contents of which document are incorporated herein by reference, and allow, as a post-processing operation on the captured image data, image material at certain depths to be brought into focus or de-focused. Accordingly, although such a camera may be used with the time-division infrared illumination discussed above, it can also provide the function of separating near (foreground) objects such as the user's hands and arms from background objects without the need for the infrared illumination system. Other alternative cameras such as a camera which scans a narrow depth of field at different focus distances can also be used in this context.

FIG. 20 schematically illustrates a dual-view camera which allows a single camera to be used in respect of the two functions discussed above for the camera 910. A camera element 1000 receives light from an array of mirrors 1010, 1020, 1030, 1040 such that one laterally divided portion 1050 of the captured image receives light reflected by the mirrors 1010, 1020, and another laterally divided portion 1060 of the captured image receives light reflected by the mirrors 1040, 1030. One of these paths can be made sensitive to infrared illumination and the other to visible light illumination.

FIG. 21 is a schematic flowchart showing operations of the system of FIG. 17, comprising the steps of: illuminating, at a step 1200, using an infrared light source, foreground objects but not background objects greater than a threshold distance from the HMD, the illuminating step 1200 comprising the infrared light source providing illumination for successive intervals of time separated by intervals during which the infrared light source does not provide illumination; capturing, at a step 1210, infrared illuminated images during the intervals in which the infrared light source provides illumination; capturing, at a step 1220, visible light illuminated images during the intervals in which the infrared light source does not provide illumination; and detecting, at a step 1230, from the infrared illuminated images, foreground objects in the visible light illuminated images.

Figure 22:
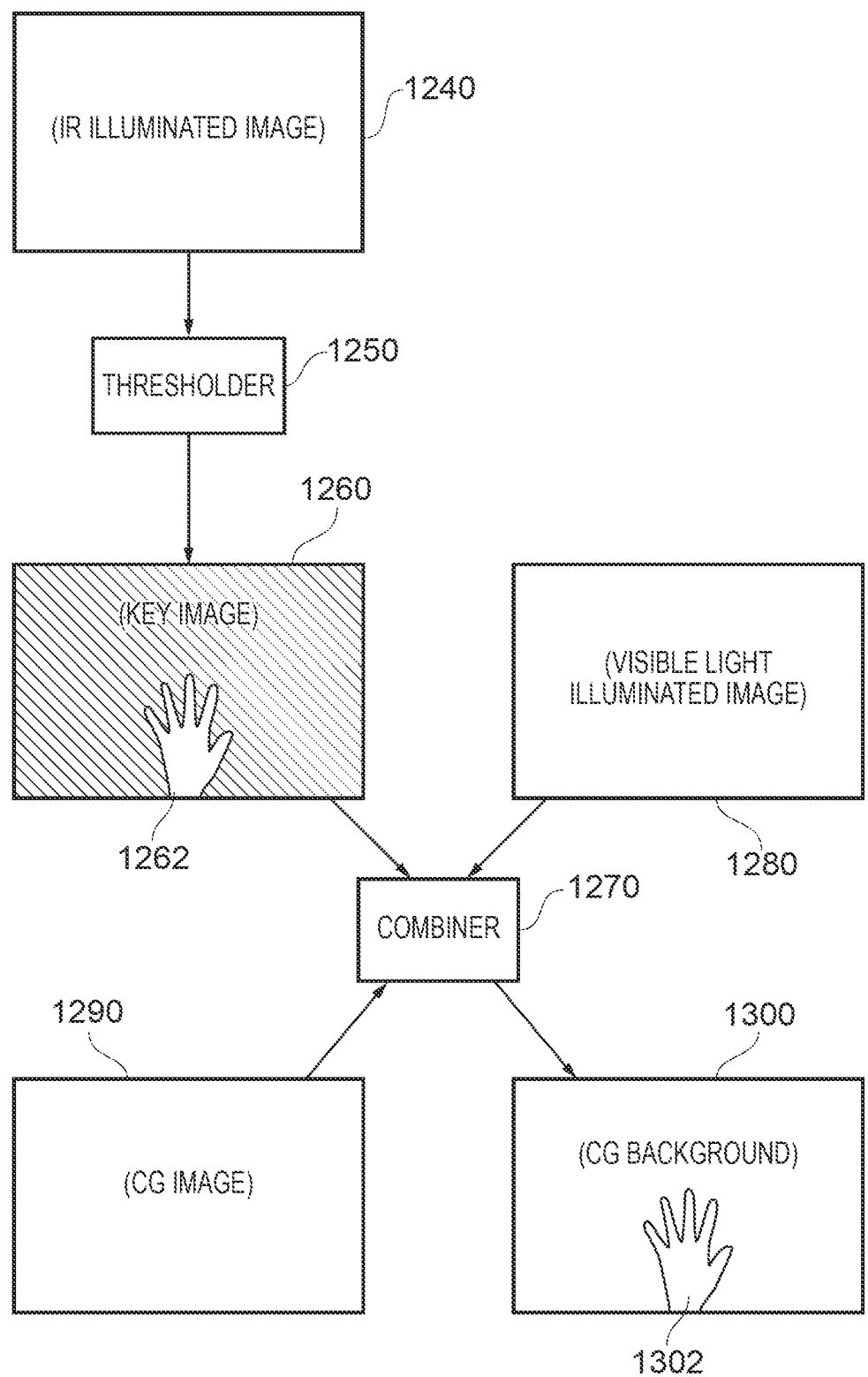
FIG. 22 schematically illustrates a keying process.

FIG. 22 schematically illustrates a keying process. The process may be carried out by the image processor 930, for example.

The image processor 930 receives an infrared illuminated image 1240 and applies (as part of the operation of the image processor 930) a threshold operation by a thresholder 1250. In this operation, parts of the infrared illuminated image with a luminance greater than a threshold are separated from other parts of the image. Optionally, smoothing or other filtering processes may also be applied so as to aim to remove spurious image points which exceed the threshold. This generates a key image 1260 which can be a one bit binary image in which each pixel position is set to one value if a part of the image 1240 exceeded the threshold, and another value if not (also taking into account the optional filtering process mentioned above). An example key image is illustrated in which an area 1262 corresponding to that of a user's hand is set to one value, and the remaining area (shown shaded for the purposes of the drawing) is set to another value.

A combiner 1270, forming part of the image processor 930, acts on the key image 1260 (such as a key image generated in respect of a most recently captured (or at least most recently processed) infrared illuminated image), a most recently captured visible light illuminated image 1280, and a game or computer generated image 1290. Parts of the key image such as the area 1262 are used to control the writing of corresponding portions 1302 of the visible light illuminated image 1280 into an output image 1300. Other areas such as the shaded area of the image 1260 control writing of corresponding parts of the CG image 1290 to the output image 1300. Accordingly the output image 1300 represents a mixture of the image 1280 and the image 1290 according to the state of the key image 1260 at each pixel position.

In terms of timing, the keying operation discussed above can be carried out, for example, at each image period of the CG image 1290, using the most recently available key image and visible light illuminated image at that time.

In an alternative arrangement, instead of the visible light image being used directly, the area 1262 of the key image is used to detect colour and/or texture properties of the image 1280 at the positions 1262, which properties and positions are then used to control the generation, by the game engine or the image processor 930, of a computer generated version of the area 1262 (for example a hand) with similar colours and textures. FIG. 23 is a schematic flowchart showing operations relating to generating such a keyed image, in which at a step 1320, colour and/or texture properties at the positions 1262 are detected from the visible light image, and at a step 1330, a keyed image is created using the detected properties as discussed above.

FIG. 24 is a schematic flowchart showing control based on hand/arm positions. The key image 1260, or another representation are used by the image processor 930 to detect, at a step 1340, hand and/or arm positions of the user. This process can be carried out based on the shapes of (for example) regions such as the region 1262. It can be assisted by the user wearing infrared reflective markings such as reflective gloves, reflective nail varnish or the like. Basic positions as well as gestures can be detected. At a step 1350 these are used to control data processing, for example game operation.

FIGS. 25 and 26 are schematic timing diagrams showing further possibilities relating to FIG. 18.

In FIG. 25, the period of illumination of the infrared illumination is longer than that of the period of non-illumination.

In FIG. 26, two visible light images are captured during each period of non infrared illumination, compared to one infrared illuminated image during each period of infrared illumination.

Further optional features include the use of the visible light images to correct the lighting on the image of the human hands to remove local light sources and any colour hue caused by the tracked hand or controller so that the image of the hand in game might sit more convincingly in the game world and conform to the game worlds light direction and colour instead; and the conversion of the hand images into skeletal coordinates so that the fingers and hands could be in the correct place, but entirely rendered in the games fiction (i.e. if you were an green alien, the infrared hand detection could be used to animate alien hands that conform to the location of your hands and fingers).

A further possible use of this technology relates to user safety. If something is in range of the infrared illumination, it is automatically rendered into the game world to identify the hazard (i.e. coffee table, wall, etc.). This would make it easier for the player to choose a safe play space whilst wearing the HMD, and if they walked towards a TV, they would notice this as the TV would appear in their vision before they made contact with it.

In some embodiments, the light could switch quickly between two different intensities to estimate the relative distance of image features through the change in gradient (for example, the change in relative illumination between different parts of the infrared illuminated image, considered over time). In some embodiments an infrared light bar or light array could be used so that switching can be not only by intensity but also by position. At a frequency high enough this would allow for getting a potentially more accurate representation of the hands in front of the player, as different areas of the foreground could be illuminated at different times. In either of these two examples, as in other examples, more than one infrared illuminated image may be captured during a single period of infrared illumination. A single period of infrared illumination may have an illumination during the period which is non-uniform temporally or spatially.

Accordingly, embodiments of the invention can provide a head mountable display (HMD) comprising: an infrared light source operable to illuminate foreground objects but not background objects greater than a threshold distance from the HMD; one or more cameras operable to capture infrared illuminated images and visible light illuminated images; and an image processor operable to detect, from the infrared illuminated images, foreground objects in the visible light illuminated images.

In some embodiments, the image processor is operable to select foreground objects from the visible light illuminated images for keying into a computer-generated image for display to the wearer of the HMD. In other embodiments, the image processor is operable to detect a colour or texture of foreground objects from the visible light illuminated images for controlling the generation of a computer-generated image for display to the wearer of the HMD.

Although the images could be captured at the same time, in some embodiments the infrared light source is arranged to provide illumination for successive intervals of time separated by intervals during which the infrared light source does not provide illumination. For example, the one or more cameras may be arranged to capture the infrared illuminated images during the intervals in which the infrared light source provides illumination, and/or the one or more cameras may be arranged to capture the visible light illuminated images during the intervals in which the infrared light source does not provide illumination. This then allows the one or more cameras to comprise a single camera arranged to operate in turn to capture infrared illuminated images and visible light illuminated images.

Alternatively, the one or more cameras may comprise a single camera and a light-directing arrangement for directing infrared and visible light to different image regions of the single camera.

In embodiments of the invention the image processor can be operable to detect a user's hand and/or arm positions from the infrared illuminated images and to provide control data to control a data processing operation based on the detected hand and/or arm positions.

Embodiments of the invention also provide a head mountable display (HMD) comprising: one or more cameras (such as the light field camera discussed above) operable to capture an image of foreground objects but to exclude background objects; and an image processor operable to select foreground objects for keying into a computer-generated image for display to the wearer of the HMD, for controlling the generation of a computer-generated image for display to the wearer of the HMD, and/or to provide control data to control a data processing operation based on the detected hand and/or arm positions.

Embodiments of the invention also provide a method of operation of a head mountable display (HMD), the method comprising the steps of: illuminating, using an infrared light source, foreground objects but not background objects greater than a threshold distance from the HMD; capturing infrared illuminated images and visible light illuminated images; and detecting, from the infrared illuminated images, foreground objects in the visible light illuminated images.

Embodiments of the invention also provide a method of operation of a head mountable display (HMD), the method comprising the steps of: capturing an image of foreground objects but to exclude background objects; and selecting foreground objects for keying into a computer-generated image for display to the wearer of the HMD, for controlling the generation of a computer-generated image for display to the wearer of the HMD, and/or to provide control data to control a data processing operation based on the detected hand and/or arm positions.

The HMD could be displaying computer game material, for example. The HMD can be associated with one or more other devices such as a games console and/or a break-out box.

Embodiments of the invention also provide a system of an HMD, one or more peripheral or control devices, and optionally a base device such as a games console or break-out box.

It will be appreciated that embodiments of the present invention may be implemented in hardware, programmable hardware, software-controlled data processing arrangements or combinations of these. It will also be appreciated that computer software or firmware used in such embodiments, and providing media for providing such software or firmware (such as storage media, for example a machine-readable non-transitory storage medium such as a magnetic or optical disc or a flash memory) are considered to represent embodiments of the present invention.

Obviously, numerous modifications and variations of the present disclosure are possible in light of the above teachings. It is therefore to be understood that within the scope of the appended claims, the invention may be practiced otherwise than as specifically described herein.

We claim:

1. A head mountable display (HMD) comprising:
an infrared light source configured to illuminate foreground objects but not background objects greater than a threshold distance from the HMD, the infrared light source being configured to provide illumination for successive intervals of time separated by intervals during which the infrared light source does not provide illumination;
one or more cameras configured to capture infrared illuminated images and visible light illuminated images, the one or more cameras being configured to capture the infrared illuminated images during the intervals in which the infrared light source provides illumination and configured to capture the visible light illuminated images during the intervals in which the infrared light source does not provide illumination; and
an image processor configured to detect, from the infrared illuminated images, foreground objects in the visible light illuminated images;
in which the one or more cameras comprise a single camera and a light-directing arrangement for directing infrared and visible light to different image regions of the single camera.

2. An HMD according to claim 1, in which the image processor is configured to select foreground objects from the visible light illuminated images for keying into a computer-generated image for display to the wearer of the HMD.

3. An HMD according to claim 2, in which the image processor is configured to generate a key signal indicative of positions of detected foreground objects.

4. An HMD according to claim 1, in which the image processor is configured to detect a colour or texture of foreground objects from the visible light illuminated images for controlling generation of a computer-generated image for display to the wearer of the HMD.

5. An HMD according to claim 1, in which the one or more cameras comprise a single camera configured to operate in turn to capture infrared illuminated images and visible light illuminated images.

6. An HMD according to claim 1, in which the image processor is configured to detect a user's hand and/or arm positions from the infrared illuminated images and to provide control data to control a data processing operation based on the detected hand and/or arm positions.

7. A method of operation of a head mountable display (HMD), the method comprising the steps of:
illuminating, using an infrared light source, foreground objects but not background objects greater than a threshold distance from the HMD, the illuminating step comprising the infrared light source providing illumination for successive intervals of time separated by intervals during which the infrared light source does not provide illumination;
capturing infrared illuminated images and visible light illuminated images, the capturing step comprising capturing the infrared illuminated images during the intervals in which the infrared light source provides illumination and capturing the visible light illuminated images during the intervals in which the infrared light source does not provide illumination; and
detecting, from the infrared illuminated images, foreground objects in the visible light illuminated images;
in which the capturing step comprises providing a single camera and a light-directing arrangement for directing infrared and visible light to different image regions of the single camera.

8. A method according to claim 7, comprising selecting foreground objects from the visible light illuminated images for keying into a computer-generated image for display to the wearer of the HMD.

9. A method according to claim 8, in which the selecting step comprises generating a key signal indicative of positions of detected foreground objects.

10. A method according to claim 7, comprising detecting a colour or texture of foreground objects from the visible light illuminated images for controlling generation of a computer-generated image for display to the wearer of the HMD.

11. A method according to claim 7, in which the capturing step comprises operating a single camera configured to operate in turn to capture infrared illuminated images and visible light illuminated images.

12. A method according to claim 7, comprising detecting a user's hand and/or arm positions from the infrared illuminated images and to provide control data to control a data processing operation based on the detected hand and/or arm positions.

13. A non-transitory machine-readable storage medium which stores computer software which, when executed by a computer, causes the computer to carry out the method of claim 7.

* * * * *